United States Patent
Jones, II et al.

(10) Patent No.: US 9,832,606 B1
(45) Date of Patent: Nov. 28, 2017

(54) MODIFYING USER SERVICE ENVIRONMENTS

(71) Applicant: Amazon Technologies, Inc., Seattle, WA (US)

(72) Inventors: Thomas Price Jones, II, Santa Cruz, CA (US); Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 14/572,688

(22) Filed: Dec. 16, 2014

(51) Int. Cl.
*H04W 24/00* (2009.01)
*H04W 4/02* (2009.01)
*H04L 29/08* (2006.01)

(52) U.S. Cl.
CPC .......... *H04W 4/021* (2013.01); *H04L 67/10* (2013.01); *H04W 4/028* (2013.01)

(58) Field of Classification Search
CPC ......... H04M 15/8033; H04M 15/8044; H04M 1/72566; H04M 2242/15; H04M 2242/28; H04M 2250/10
USPC ............... 455/456.3, 456.1, 456.2, 447, 41.1
See application file for complete search history.

(56) References Cited

U.S. PATENT DOCUMENTS

| | | | | |
|---|---|---|---|---|
| 2001/0035880 | A1* | 11/2001 | Musatov | G06F 3/04886 715/764 |
| 2008/0098068 | A1* | 4/2008 | Ebata | H04L 12/58 709/206 |
| 2008/0162036 | A1* | 7/2008 | Breed | G08G 1/161 701/408 |
| 2010/0217494 | A1* | 8/2010 | Heft | B60T 7/22 701/70 |
| 2010/0250497 | A1* | 9/2010 | Redlich | F41H 13/00 707/661 |
| 2013/0214939 | A1* | 8/2013 | Washlow | G01S 7/003 340/901 |
| 2014/0080440 | A1* | 3/2014 | Akiyama | H04W 4/26 455/406 |
| 2014/0180914 | A1* | 6/2014 | Abhyanker | G01C 1/00 705/39 |

* cited by examiner

*Primary Examiner* — Joseph Arevalo
(74) *Attorney, Agent, or Firm* — Thorpe North & Western, LLP.

(57) ABSTRACT

Technology is described for modifying user service environments. A geographical location of a mobile device may be received. The geographical location of the mobile device may trigger a modification to a user service environment that is associated with the mobile device. The user service environment may be modified based on the geographical location of the mobile device.

18 Claims, 9 Drawing Sheets

MODIFYING USER SERVICE ENVIRONMENTS

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) to be shared among multiple customers by providing customers with one or more computing instances hosted by the single physical host using a hypervisor. A computing instance may be a guest machine acting as a distinct logical computing system that provides a customer with the perception that the customer is the sole operator and administrator of a given virtualized hardware computing resource.

A request to launch a computing instance may entail identifying available computing resources (e.g., a computing slot in a hypervisor) on which the computing instance may be executed. For example, one or more physical hosts (e.g., server computers or physical computing machines) may be queried to determine whether sufficient computing resources exist on a physical computing machine to launch and execute a computing instance and whether a physical host meets additional specified criteria (e.g., disaster mitigation criteria, licensing criteria, etc.) for the group of physical hosts. In a case where a physical host is identified as having computing resources available to execute the computing instance and meeting the specific criteria, the computing instance may be launched on the physical host, and a customer may be notified that the computing instance has been launched. Furthermore, a computing instance may be terminated by a customer when the computing instance is not being used in order to avoid additional charges for the time the computing instance is executing.

DETAILED DESCRIPTION

Figure 1:
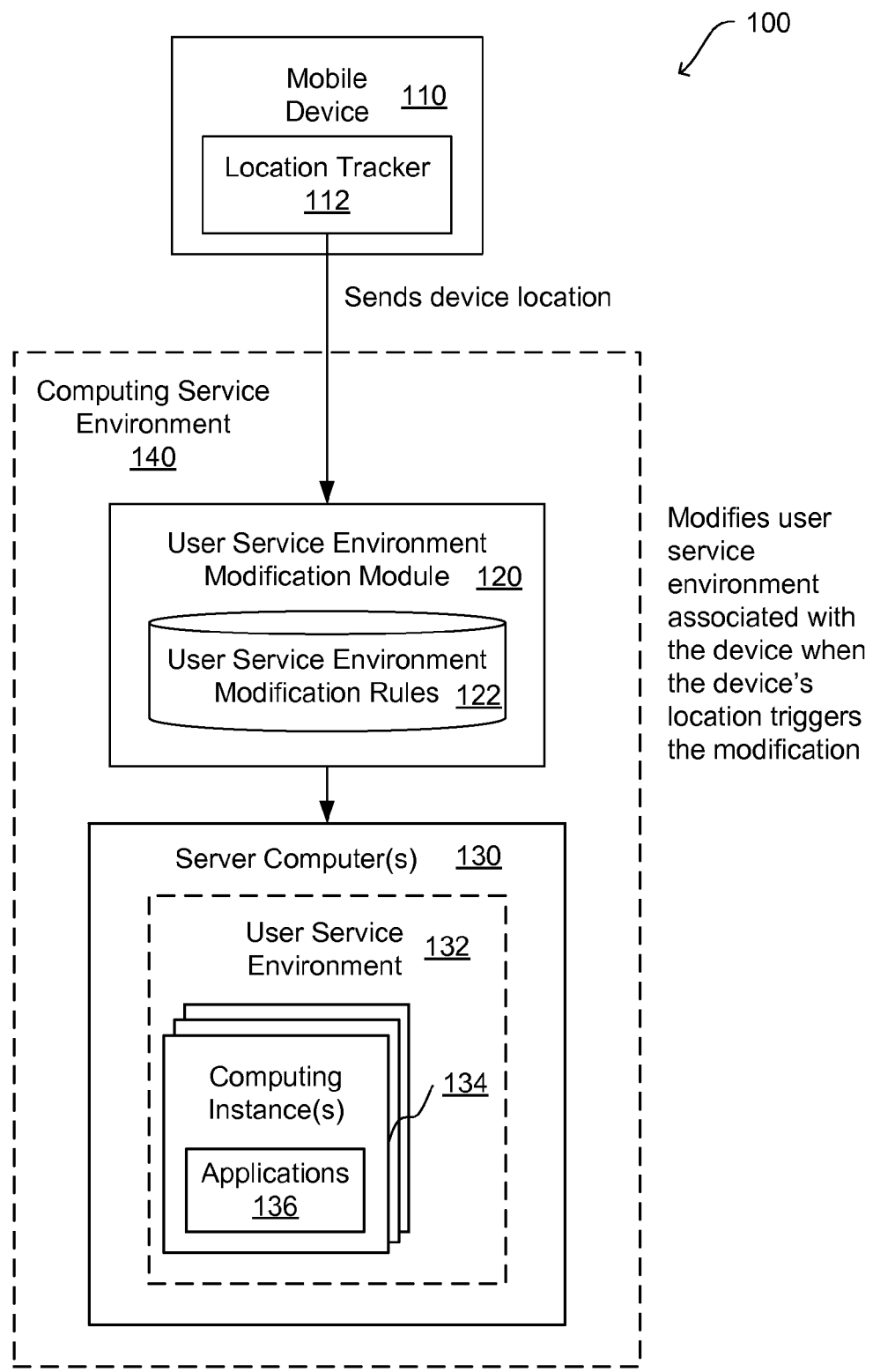
FIG. 1 illustrates a system and related operations for modifying a development environment linked with a device in response to the device's geographical location according to an example of the present technology.

A technology is described for monitoring a current geographical location of a mobile device, and depending on the mobile device's current geographical location in relation to a defined geographical boundary, a modification to a user service environment linked with the mobile device may be triggered. The user service environment may also be referred to as a user environment, a customer environment, a customer account, a virtualized user environment, or a customer execution environment. For example, the modification may include shutting down or powering on computing instances in the user service environment. In addition, applications, services, software agents, operating systems, data stores, development environments, text editors, debugging environments, build managers, compilers, services, development servers, data stores, processing clusters, or integrated development environments (IDEs) may also be started or shut down in order to modify the user service environment. The mobile device may be carried by a user, a vehicle, or located in proximity to the user. Therefore, the user's current geographical location (as determined via the mobile device) in relation to the defined geographical boundary may trigger the modification to the user service environment.

In one example, the mobile device's user may link the mobile device with a particular user service environment used by the user. The user may pair the mobile device with the user service environment via a user interface. The user service environment may be operable to perform a number of computing tasks for the mobile device's user, such as running software applications, testing of applications or data, compiling code, debugging code, performing data analysis, etc. The user service environment may include an integrated development environment (IDE) that provides a software development platform for the user. In addition, the user's mobile device may be a mobile phone, a tablet computer, a smart watch, a pager, a global positioning system (GPS) device, or a similar device.

In one configuration, the mobile device's user may provide, via the user interface, defined geographical boundaries or geo-fences. The user may select regions on a map, via the user interface, that define the geographical boundaries or provide a set of geographical coordinates that define each geographical boundary. The modification to the user service environment may be triggered using on the mobile device's current geographical location in relation to the defined geographical boundaries. In one example, the user may define a geographical boundary (e.g., a circular region with a half-mile radius of a center location) that surrounds the user's home. In another example, the user may define a geographical boundary that surrounds the user's employment location.

In one example, a user may provide, via a user interface, a defined set of rules that indicate under what geographical conditions and how the user service environment is to be modified (e.g., powered on, shut down) and a type of modification to perform. In other words, the user may define various triggers for modifying the user service environment. For example, the defined set of rules may instruct the user service environment to power on when the mobile device enters the defined geographical boundary. In another example, the defined set of rules may instruct the user service environment to shut down when the mobile device exits the defined geographical boundary. Shutting down the user service environment may save the user money, if the user is employing a system that charges based on time used or computing activity. In yet another example, the defined set of rules may instruct the user service environment to run a specific application when the mobile device exits the defined geographical boundary.

In one configuration, the current geographical location of the mobile device and the mobile device's current trajectory may be monitored. For example, the mobile device may periodically provide a current geographical location and trajectory. The mobile device may determine the mobile device's current geographical location and/or trajectory using global positioning system (GPS), inertial navigation, triangulation, or other navigation techniques. The current geographical location and trajectory may be used to modify the user service environment when the current geographical location and trajectory match criteria for modifying the user service environment. For example, the current geographical location and trajectory may indicate that the user is likely to arrive at work in 10 minutes and the user service environment may be modified as described.

The current geographical location of the mobile device may trigger the modification to the user service environment based on the defined set of rules that were previously provided by the user. In other words, the user service environment may be modified when the mobile device's current geographical location and/or trajectory triggers the modification. For example, the mobile device's current geographical location and/or trajectory may indicate that the mobile device has entered into or exited out (or soon with enter or exit) of the defined geographical boundaries, and as a result, the modification to the user service environment may be triggered. In one example, the user service environment may be modified by turning on the computing instances in the user service environment, turning off the computing instances in the user service environment, or launching and terminating specific software applications on the computing instances in the user service environment.

In one configuration, the user service environment (e.g., a development environment) may be transferred to another execution location depending on the mobile device's current geographical location. For example, machine images associated with the computing instances in the user service environment may be relocated to another storage location for later execution. As an example, the machine images for a user service environment may typically be stored in a group of servers at an availability zone (e.g., on the west coast). The machine images may be stored at this availability zone because the mobile device may be located in the west coast. However, when the mobile device's current geographical location has moved and is within another availability zone (e.g., on the east coast), instead of the user accessing and using the machine images that are stored in the original availability zone (e.g., on the west coast), the machine images may be transferred to the availability zone that is closer to the mobile device's current geographical location (e.g., the availability zone on the east coast). In addition, applications, services, IDEs, editors, etc. may be transferred to the availability zone that is closer to the mobile device's current geographical location. As a result, the machine images, applications, etc., may be stored at a storage location that is closer to the mobile device's current geographical location, thereby improving the user service environment's runtime performance and reducing latency.

FIG. 1 illustrates an exemplary system 100 and related operations for modifying a user service environment 132 associated with a mobile device 110 based on the mobile device's current geographical location. The mobile device 110 may be an Internet of Things (IOT) device. The IOT device may be assigned a unique identifier and capable of communicating data over a network. In one example, the user service environment 132 may include a development environment. The mobile device 110 may determine the current geographical location using a location tracker 112 in the mobile device 110. The mobile device 110 and/or location tracker 112 may provide the current geographical location to a user service environment modification module 120. The user service environment modification module 120 may determine whether the mobile device's geographical location triggers a modification to the user service environment 132. The user service environment modification module 120 may determine when to modify the user service environment 132 (and a type of modification) based on user service environment modification rules 122. The user service environment modification rules 122 may be defined by an administrator or a user associated with the mobile device 110.

The user service environment modification rules 122 may include a defined geographical boundary. In one example, the user service environment modification module 120 may modify the user service environment 132 when the mobile device 110 enters or exits the defined geographical boundary or geofence, as indicated by the mobile device's current geographical location. The user service environment 132 may include one or more computing instances 134 that are running on a server computer 130. The server computer 130 and the user service environment modification module 120 may be part of a computing service environment 140. In some examples, the user service environment modification module 120 may modify the user service environment 132 by turning on the computing instances 134 or turning off the computing instances 134 based on the mobile device's geographical location in relation to the defined geographical boundary. In addition, the user service environment 132 may be modified by starting applications 136 on the computing instances 134 or turning off applications 136 that are running on the computing instances 134.

Figure 2:
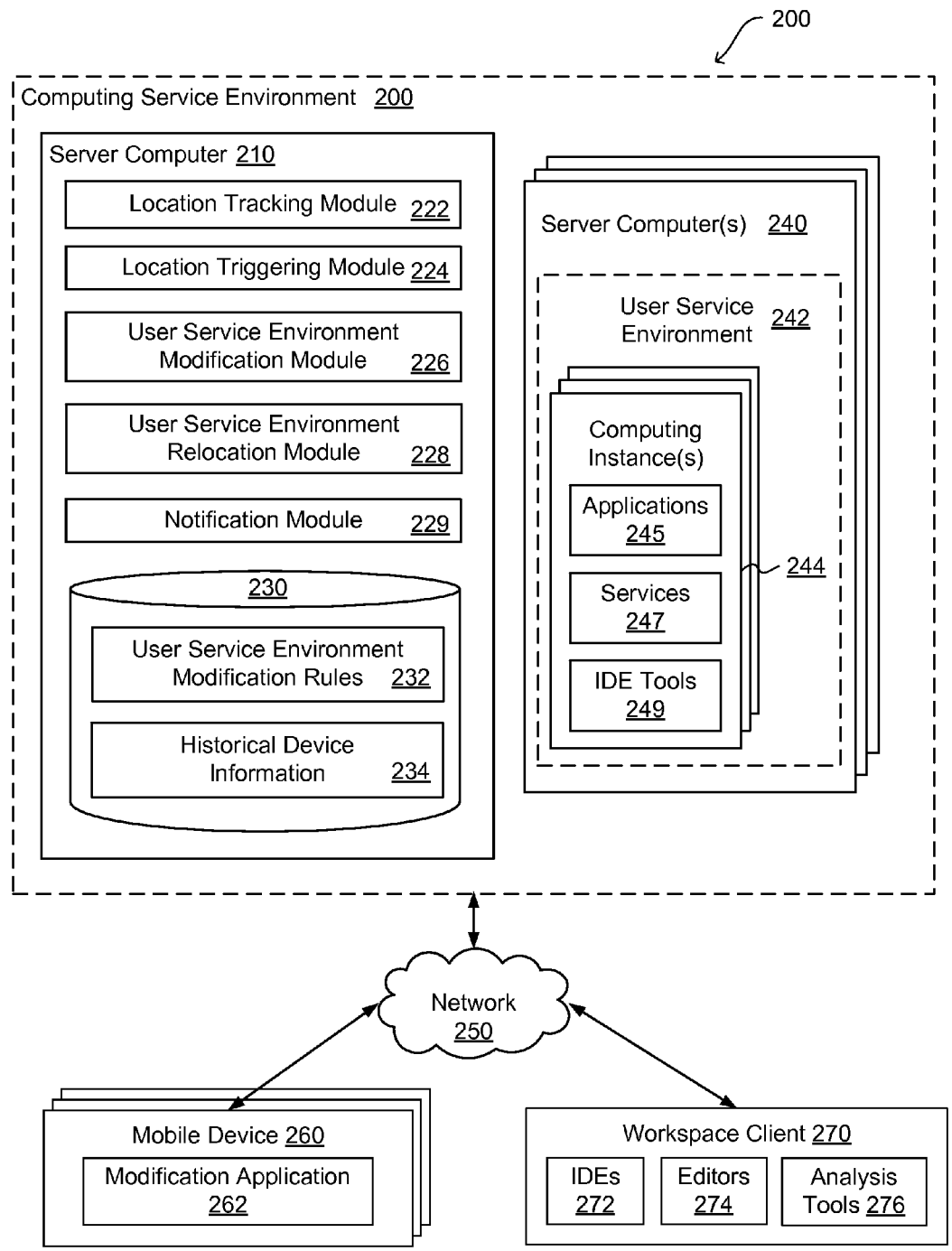
FIG. 2 is an illustration of a networked system for modifying development environments according to an example of the present technology.

FIG. 2 illustrates components of an example computing service environment 200 according to one example of the present technology. The computing service environment 200 may include a server computer 210 in communication with a number of mobile devices 260 via a network 250, and the server computer may be part of a service provided by the service provider environment 200 to modify a user service environment 242 in response to the location of a mobile device 260. The server computer 210 may contain a data store 230 and a number of modules used to modify the user service environment 242. In addition, the computing service environment 200 may include a number of server computers 240 executing a plurality of computing instances 244.

The computing instances 244 may be part of a user service environment 242. The user service environment 242 may also include applications 245, services 247 and/or integrated development environment (IDE) tools 249 that are running on the computing instances 244. In another example, the user service environment 242 may include a development environment. In other examples, the computing instances 244 in the user service environment 242 may perform a number of computing tasks for the mobile device's user, such as running software applications, performing data analysis, providing a software development platform, etc.

The data stored in the data store 230 may include user service environment modification rules 232. The user service environment modification rules 232 may be a defined set of rules that indicate when the user service environment 242 is to be modified (e.g., powered on, shut down) in response to a mobile device's location and a type of modification to perform. The user service environment modification rules 232 may be accessible and modifiable using the mobile device's user via a user interface. For example, the user interface may be part of a modification application 262 that is running on the mobile device 260. In one example, the user service environment modification rules 232 may indicate that the user service environment 242 is to be powered on when the mobile device 260 enters a defined geographical boundary. The mobile device's user may provide the defined geographical boundary via the user interface. In another example, the user service environment modification rules 232 may indicate that the user service environment 242 is to be shut down when the mobile device 260 exits the defined geographical boundary.

The data stored in the data store 230 may include historical device information 234. The historical device information 234 may include previous geographical locations of the mobile device 260 and at which times of day the mobile device 260 visited those geographical locations. Thus, the movement of the mobile device 260 may be tracked. As a non-limiting example, the historical device information 234 may indicate that the mobile device 260 generally enters a defined geographical boundary at 9 AM and exits the defined geographical boundary at 6 PM. As another non-limiting example, the historical device information 234 may indicate that the mobile device 260 generally exits a first defined geographical boundary at 8 AM (e.g., a boundary that corresponds with the mobile device user's home) and thereafter, the mobile device 260 travels in a trajectory towards a second defined geographical boundary (e.g., a boundary that corresponds with the mobile device user's work location). When the trajectory from the first geographical boundary and the second geographical boundary is identified, then the modifications to the user service environment may occur in anticipation that the user is likely headed to work as defined by the historical information. If this trajectory is identified on a weekend where the user does not usually enter the second geographic boundary but heads to another part of the city near the second defined boundary then the user service environment will not be modified. In one example, the historical device information 234 may be gathered over a period of time (e.g., two months), and then the historical device information 234 may be used for automatic modifications to the user service environment 242.

The server computer 210 may include a location tracking module 222, a location triggering module 224, a user service environment modification module 226, a user service environment relocation module 228, a notification module 229, and other applications, services, processes, systems, engines, or functionality not discussed in detail herein. The location tracking module 222 may be configured to monitor a current geographical location of the mobile device 260. The location tracking module 222 may periodically receive the mobile device's current location from the mobile device 260. The mobile device 260 may determine its current geographical location using global positioning system (GPS), inertial navigation, triangulation, or other navigation techniques. The location tracking module 222 may receive the mobile device's current geographical location as geographical coordinates (e.g., latitude and longitude). The location tracking module 222 may also monitor the mobile device's current trajectory (e.g., that the mobile device 260 is traveling in a northwest direction). In one example, the location tracking module 222 may receive the mobile device's current geographical location from a radio frequency identification (RFID) reader that is configured to communicate over the network 250. The RFID reader (e.g., at an entrance of a building) may detect a RFID tag (or RFID sensor) on the mobile device 260, and then notify the location tracking module 222 of the mobile device's location and direction.

The location triggering module 224 may be configured to determine that the current geographical location of the mobile device 260 triggers a modification to the user service environment 242 that is linked to the mobile device 260. For example, modifications to the user service environment 242 may be triggered when the mobile device 260 enters a defined geographical boundary, as indicated by the mobile device's current geographical location and trajectory. In addition, the modification to the user service environment 242 may be triggered when the mobile device 260 exits a defined geographical boundary, as indicated by the mobile device's current geographical location and trajectory. In one example, the location triggering module 224 may determine that the current geographical location of the mobile device triggers the modification to the user service environment 242 based on the user service environment modification rules 232. In other words, the user service environment modification rules 232 may define certain geographical boundaries that, if entered into or exited out of by the mobile device 260, trigger the modification to the user service environment 242.

The user service environment modification module 226 may be configured to modify the user service environment 242 according to the user service environment modification rules 232 based on the current geographical location of the mobile device 260. The user service environment modification module 226 may activate or deactivate a portion of the user service environment 242. In one example, the user service environment modification module 226 may turn on the user service environment 242 when the mobile device 260 enters the defined geographical boundary. In another example, the user service environment modification module 226 may turn off the user service environment 242 when the mobile device 260 exits the defined geographical boundary. In other examples, the user service environment modification module 226 may modify the user service environment 242 by running specific software applications on the computing instances 244 in the user service environment 242, loading computing instances 244, loading certain types of computing instances 244, or opening a port in a firewall in the user service environment 242. In one configuration, the user service environment modification module 226 may modify the user service environment 242 based on the historical device information 234. For example, if the mobile device 260 generally enters the defined boundary at 8 AM on weekdays, the user service environment modification module 226 may automatically turn on the user service environment 242 associated with the mobile device 260 at 8 AM if the user's mobile device has left the user's home geographic location but has not arrived at a work geographic location yet.

The user service environment relocation module 228 may be configured to transfer certain aspects of the user service environment 242 to another location based on the mobile device's current location. The user service environment relocation module 228 may determine that the current geographical location of the mobile device 260 is within a defined region (e.g., the eastern United States). The region may include an availability zone (e.g., a data center) containing a group of servers. For example, the availability zone may be in Virginia (which is within the region of the eastern United States). The user service environment relocation module 228 may determine that machine images for the computing instances 244 in the user service environment 242 are not currently stored on the group of servers in the availability zone. The user service environment relocation module 228 may transfer the machine images from a previous storage location (i.e., an availability zone in a different region) to a storage location or a group of servers in the availability zone. In other words, the machine images may be transferred to the availability zone within the region that the mobile device 260 is currently within. As a result, the machine images may be stored within an availability zone that is closer to the mobile device's current geographical location, thereby improving the launching of computing instances 244 for the user service environment. Further the computing instances or applications may be launched in the availability zone that is near the user which can reduce latency for the user who is accessing the user service environment.

The notification module 229 may be configured to notify the user when modifications are performed to the user service environment 242. For example, the notification module 229 may provide a notification when the user service environment 242 is turned on or when the user service environment 242 is turned off. In another example, the notification module 229 may provide the notification when a server, an application, a service, or a development environment is launched or shut down. In one configuration, the notification module 229 may send a notification that prompts the user to authorize the modification to the user service environment 242.

The mobile device 260 may be utilized by a customer to request the launching of a computing instance and to control an executing computing instance. The mobile device 260 may include any device capable of sending and receiving data over the network 250. In one example, the mobile device 260 may be an Internet of Things (IOT) device. The mobile device 260 may comprise, for example a processor-based system such as a computing device. The mobile device 260 may be a device such as, but not limited to: a laptop or notebook computer, tablet computer, handheld computer, mobile phone, smart watch, or other devices with like capability.

The mobile device 260 may execute the modification application 262. The modification application 262 may allow the user to define the geographical boundaries via the user interface. For example, the user may define a first geographical boundary surrounding the user's home and a second geographical boundary surrounding the user's workplace via the user interface in the modification application 262. In addition, the modification application 262 may allow the user to define which modifications to perform on the user service environment 242 (e.g., turn on or turn off applications) based on the mobile device's geographical location.

In one configuration, a workspace client 270 may also be modified by the movement of the mobile device's user. For example, the workspace client 270 may be a desktop computer in the user's workplace. The workspace client 270 may provide a user interface that allows the user to interact with the applications 245, services 247, etc. that are being executed on the computing instances 244. The workspace client 270 may also include integrated development environments (IDEs) 272, editors 274 and/or analysis tools 276 that are used to create applications and services.

The various processes and/or other functionality contained within the computing service environment 200 may be executed on one or more processors that are in communication with one or more memory modules. The computing service environment 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
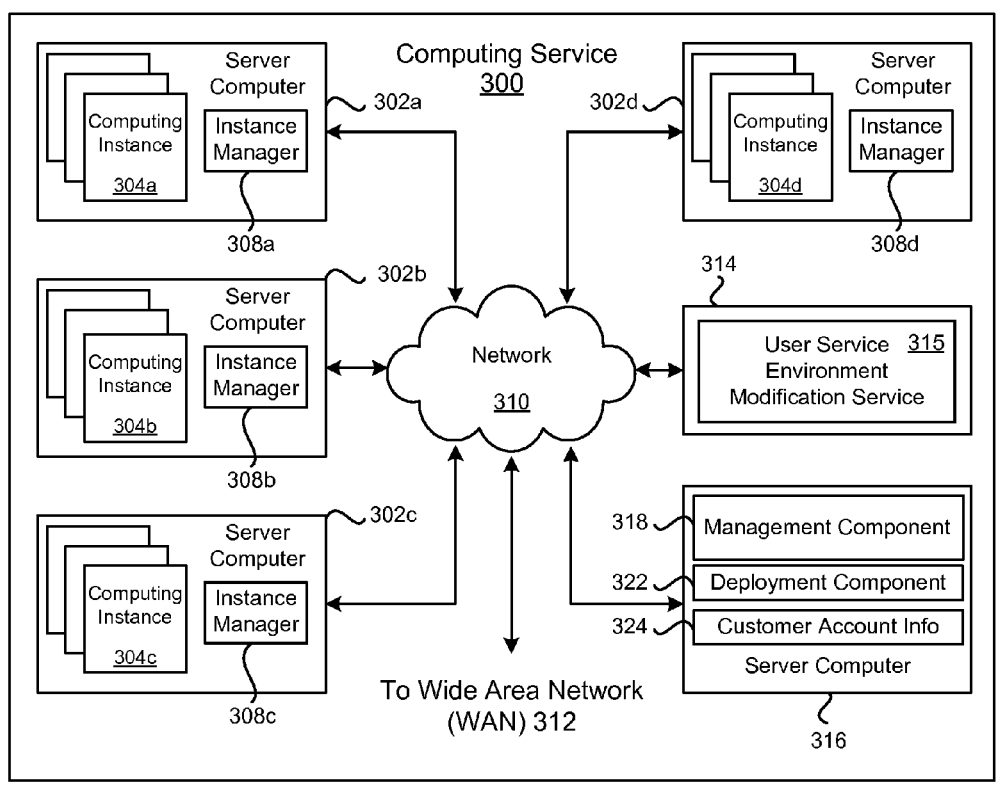
FIG. 3 is a block diagram of a computing service environment according to an example of the present technology.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302*a*-*d*. The server computers 302*a*-*d* may also be known as physical hosts. While four server computers are shown, any number may be used, and large data centers may include thousands of server computers. The computing service 300 may provide computing resources for executing computing instances 304*a*-*d*. Computing instances 304*a*-*d* may, for example, be virtual machines. A virtual machine may be an instance of a software implementation of a machine (i.e. a computer) that executes applications like a physical machine. In the example of a virtual machine, each of the server computers 302*a*-*d* may be configured to execute an instance manager 308*a*-*d* capable of executing the instances. The instance manager 308*a*-*d* may be a hypervisor, virtual machine monitor (VMM), or another type of program configured to enable the execution of multiple computing instances 304*a*-*d* on a single server. Additionally, each of the computing instances 304*a*-*d* may be configured to execute one or more applications.

One or more server computers 314 and 316 may be reserved to execute software components for managing the operation of the computing service 300 and the computing instances 304*a*-*d*. For example, the server computer 314 may execute a user service environment modification service 315 that may perform service environment modification functions, such as turning on the computing instances 304*a*-*d*, turning off the computing instances 304*a*-*d*, launching and terminating services, launching and terminating an integrated user service environment, or launching and terminating software applications on the computing instances 304*a*-*d*.

A server computer 316 may execute a management component 318. A customer may access the management component 318 to configure various aspects of the operation of the computing instances 304*a*-*d* purchased by a customer. For example, the customer may setup computing instances 304*a*-*d* and make changes to the configuration of the computing instances 304*a*-*d*.

A deployment component 322 may be used to assist customers in the deployment of computing instances 304*a*-*d*. The deployment component 322 may have access to account information associated with the computing instances 304*a*-*d*, such as the name of an owner of the account, credit card information, country of the owner, etc. The deployment component 322 may receive a configuration from a customer that includes data describing how computing instances 304*a*-*d* may be configured. For example, the configuration may include an operating system, provide one or more applications to be installed in computing instances 304*a*-*d*, provide scripts and/or other types of code to be executed for configuring computing instances 304*a*-*d*, provide cache logic specifying how an application cache should be prepared, and other types of information. The deployment component 322 may utilize the customer-provided configuration and cache logic to configure, prime, and launch computing instances 304*a*-*d*. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302*a*-*d*, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302*a*-*d*. The network topology illustrated in FIG. 3 has been simplified, as many more networks and networking devices may be utilized to interconnect the various computing systems disclosed herein.

Figure 4:
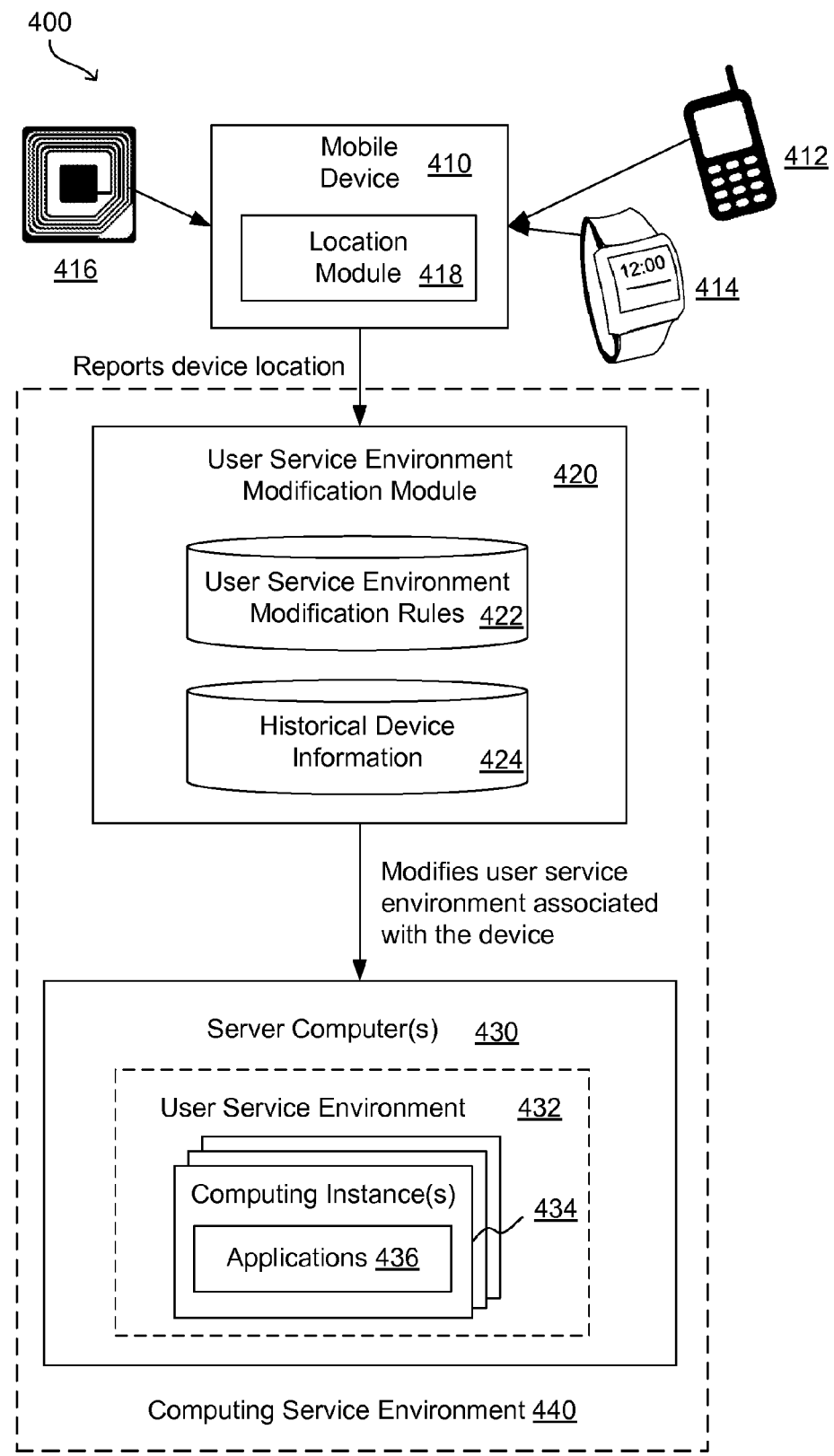
FIG. 4 illustrates a system and related operations for modifying a development environment linked with a device in response to the device's current geographical location or historical geographical locations according to an example of the present technology.

FIG. 4 illustrates an exemplary system 400 and related operations for modifying a user service environment 432 associated with a mobile device 410 based in part on the mobile device's current location and/or historical locations. The mobile device 410 may be carried by a user or located in proximity to the user. Therefore, the user's current geographical location (as determined via the mobile device 410) may trigger a modification to the user service environment 432. Some examples of modifications may include shutting down or launching the user service environment 432 or portions of the user service environment 432. In some examples, the mobile device 410 may include a mobile phone 412, a smart watch 414, or a similar type of computing device.

In one example, the mobile device's user may link or associate the mobile device 410 with the user service environment 432 that is used by the user. The user may pair the mobile device 410 with the user service environment 432 via a user interface. The user service environment 432 may include a number of computing instances 434 and applications 436 that are running on one or more server computers 430. The user service environment 432 may be operable to perform a number of computing tasks for the mobile device's user, such as running software applications 436, performing data analysis, executing services, etc. The user service environment 432 may also include a development environment, such as an integrated development environment (IDE), which provides a software development platform for the user.

In one configuration, the mobile device 410 may include a location module 418 for determining the mobile device's current geographical location. For example, the location module 418 may determine the mobile device's current geographical location using global positioning system (GPS), inertial navigation, triangulation, or other navigation techniques. In addition, the location module 418 may determine a current trajectory of the mobile device 410. For example, the mobile device's trajectory may indicate that the mobile device is traveling at 90 degrees at a specific speed. The mobile device's current trajectory may be calculated using a compass convention where 0 degrees is north, 90 degrees is east, etc.

The mobile device 410 may periodically provide its current geographical location and trajectory to a user service environment modification module 420. The user service environment modification module 420 may be part of a computing service environment 440. In one example, the mobile device 410 may include a radio frequency identification (RFID) tag 416 (or RFID sensor) or a passive proximity security card. The RFID tag 416 on the mobile device 410 may be detected by an RFID reader at a defined location (e.g., in the user's work building). When the RFID reader detects the RFID tag 416 on the mobile device 410, the RFID reader may report to the user service environment modification module 420 that the mobile device 410 is at the defined location. In addition, the RFID reader may report the user's current direction (e.g., whether the user entered into the building or exited the building) to the user service environment modification module 420.

The user service environment modification module 420 may determine whether the mobile device's current geographical location and/or trajectory triggers the modification to the user service environment 432. The user service environment modification module 420 may determine whether to modify the user service environment 432 based on user service environment modification rules 422. The user service environment modification rules 422 may be defined by the mobile device's user via a user interface. The user service environment modification rules 422 may indicate when the user service environment 432 is to be modified (e.g., powered on, shut down or otherwise modified) and a type of modification to perform. For example, the user service environment modification rules 422 may instruct the user service environment 432 to be modified when the mobile device 410 enters or exits a defined geographical boundary or geofence, as indicated by the mobile device's current geographical location and trajectory. The defined geographical boundary may have been previously provided by the user via the user interface.

Based on the mobile device's current geographical location and/or trajectory and the user service environment modification rules 422, the user service environment modification module 420 may modify the user service environment 432. In one example, the modification may include launching the computing instances 434, other applications, and services in the user service environment 432 when the mobile device 410 crosses the defined geographical boundary. In another example, the modification may include shutting down the computing instances 434, other applications, and services in the user service environment 432 when the mobile device 410 crosses the defined geographical boundary. The computing instances 434 may be executed on the one or more server computers 430 in the computing service environment 440.

In one configuration, a notification may be sent to the mobile device 410 prior to the user service environment 432 being modified. The mobile device's user may authorize the modification and the modification may be subsequently performed to the user service environment 432. For instance, the user may approve of the modification and provide authentication credentials to enable the modification to take place.

As a non-limiting example, if the mobile device 410 exits the defined geographical boundary surrounding the user's home at 8 AM and heads in a direction towards the user's workplace (as indicated by the mobile device's trajectory), the user service environment modification module 420 may launch the user's user service environment 432. In other words, the mobile device's location and trajectory may indicate that the user is likely traveling to the workplace and therefore, the user service environment 432 is to be launched. This enables the user service environment to be ready and waiting for the user to begin the workday with less delay before starting development and testing work and without incurring the cost or security risks that leaving the user service environment running during the nights, weekends or holidays might otherwise incur.

Other examples of modifying the user service environment 432 may include running specific software applications on the computing instances 434 in the user service environment 432, launching services, or opening a port in a firewall in the user service environment 432. In one example, the user may automatically clock into a timecard application when the mobile device 410 crosses the defined geographical boundary. In an additional example, the mobile device 410 may function as a pager and receive dispatched calls from a central location, such as a service center. The mobile device's user may be responsible for troubleshooting applications, computing instances, etc. that are not functioning properly. The mobile device's current location may indicate whether to dispatch a call to the mobile device 410, or if the mobile device 410 is outside the defined geographical boundary (e.g., the workplace), the call may be forwarded to another device that is within the defined geographical boundary. Therefore, the user may be forwarded the call if the user is at the workplace, but if the user is not at the workplace, the call may be forwarded to another device.

In another example, the modification to the user service environment 432 may include modifying a storage location for storing data associated with the user service environment 432. The storage location may be modified based on the mobile device's current geographical location. For example, the mobile device's user may be traveling in the European Union and initiates a data upload to the user service environment 432. The user's storage policy may limit the storage of data to storage locations in the United States and not in other countries. So upon detection of the mobile device's current geographical location (i.e., the European Union), the user service environment 432 may be modified such that the data is prevented from being stored in the European Union, and instead, the data may be stored at a storage location in the United States.

In general, the present technology may enable computing instances 434, applications, services and other tools in the user service environment 432 to be executed when the user intends to use the computing instances 434 (e.g., during working hours). In addition, the computing instances 434, applications, services and other tools may not be executed when the user does not intend to use the computing instances 434 (e.g., during nights or weekends). As a result, the user may save money by not running the computing instances 434 during times when the user does not intend to access the computing instances 434. In other words, automatically or remotely modifying the user service environment 432 based on the mobile device's current geographical location may reduce costs associated with running the computing instances 434. Furthermore, the user may not be burdened with manually shutting down the computing instances 434, applications, services and other tools because the computing instances 434 may be automatically shut down when the user leaves the workplace.

In another configuration, the user service environment modification module 420 may modify the user service environment 432 according to historical device information 424. The historical device information 424 may include historical geographical locations of the mobile device 410. The historical device information 424 may also include previous times at which the mobile device 410 visited these geographical locations. Machine learning techniques (e.g., pattern recognition) may be applied to the historical device information 424 in order to detect patterns in the mobile device's locations. As a non-limiting example, the historical device information 424 may indicate that the mobile device 410 generally enters the defined geographical boundary at 9 AM on weekdays and exits the defined geographical boundary at 6 PM on weekdays. Therefore, the user service environment modification module 420 may modify the user service environment 432 at a current time (e.g., 9 AM on a Tuesday) that corresponds with the mobile device's previously visited geographical locations if the mobile device 410 has left the user's home geographic location but has not arrived at a work geographic location yet. The historical device information 424 may be gathered over a period of time (e.g., two months), and then the historical device information 424 may be used to automatically modify the user service environment 432.

Figure 5A:
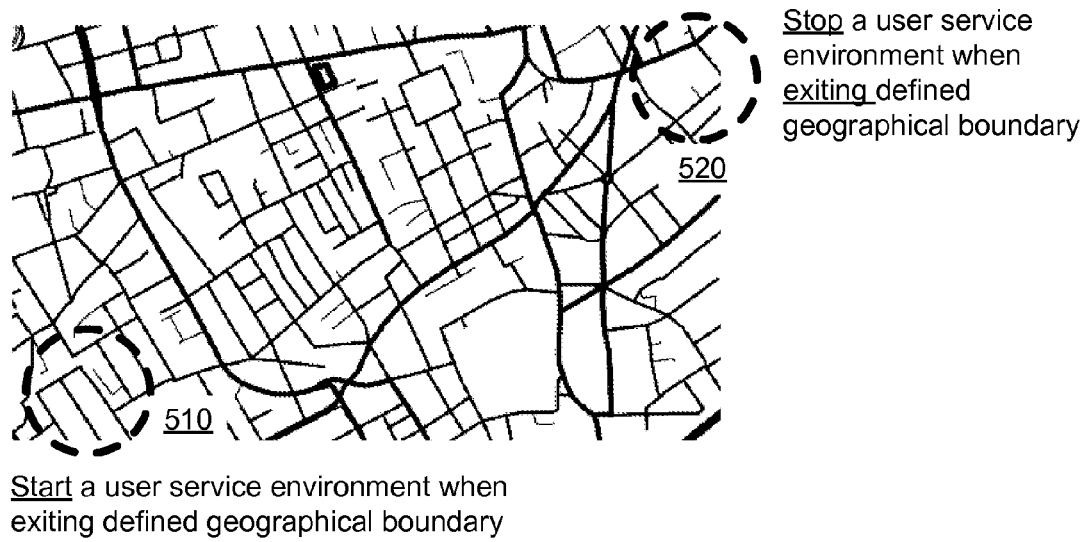
FIGS. 5A and 5B illustrate modifying a development environment based on a device's current geographical location in relation to a defined geographical boundary according to an example of the present technology.

FIG. 5A illustrates modifying a user service environment based on a mobile device's current geographical location in relation to multiple defined geographical boundaries. The mobile device's user may define the geographical boundaries via a user interface. For example, a first geographical boundary 510 may be defined that surrounds the user's home. In addition, a second geographical boundary 520 may be defined that surrounds the user's workplace. When the mobile device exits the first geographical boundary 510 (e.g., when the mobile device's user leaves home to travel to work), the user service environment (e.g., development environment) may be remotely powered on. When the mobile device exits the second geographical boundary 520 (e.g., when the mobile device's user leaves work to travel back home), the user service environment may be remotely powered off. In another example, specific applications may be triggered to run in the user service environment when the mobile device enters or exits the second geographical boundary 520.

In one configuration, the user service environment may be modified in stages depending on the mobile device's location in relation to the geographical boundaries. For example, computing instances may be started when the mobile device exits the first geographical boundary 510 and applications and/or IDEs may be started when the mobile device enters the second geographical boundary 520.

Figure 5B:
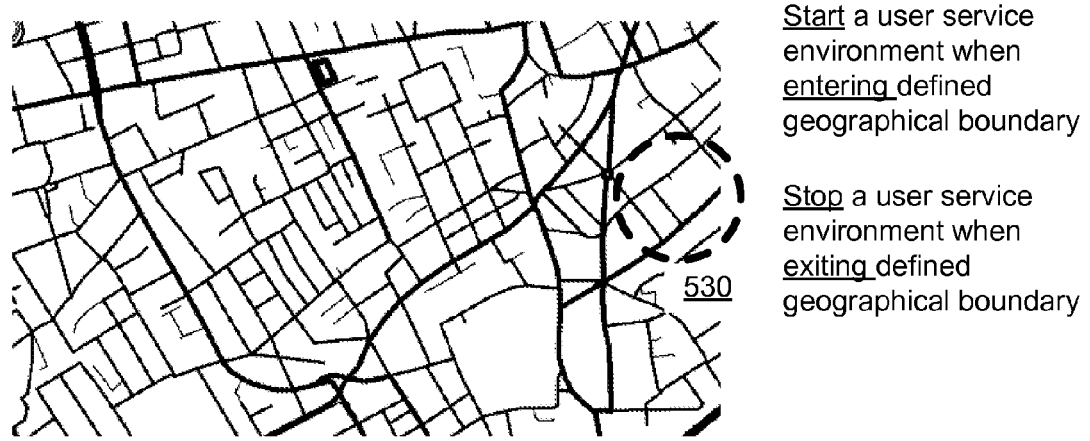

FIG. 5B illustrates modifying a user service environment based on a mobile device's current geographical location in relation to a defined geographical boundary 530. The mobile device's user may define the geographical boundary via a user interface. For example, the user may define the geographical boundary 530 to surround the user's workplace. When the mobile device enters the geographical boundary 530 (e.g., when the mobile device's user arrives at work), the user service environment (e.g., development environment) may be automatically powered on. When the mobile device exits the geographical boundary 530 (e.g., when the mobile device's user leaves work), the user service environment may be automatically powered off. In another example, specific applications may be triggered to run in the user service environment when the mobile device enters or exits the geographical boundary 530.

Figure 6:
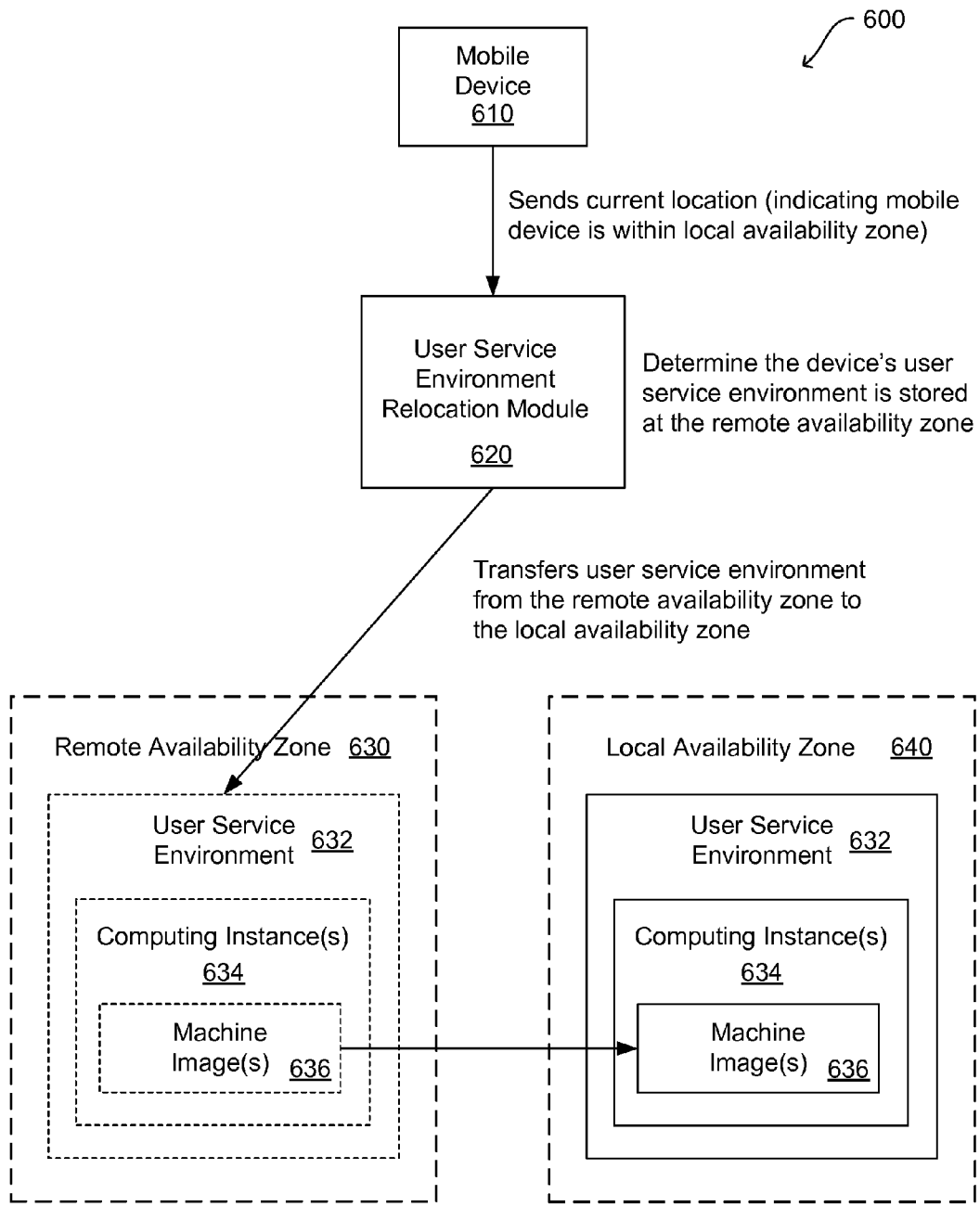
FIG. 6 illustrates a system and related operations for transferring development environments based on a device's current geographical location according to an example of the present technology.

FIG. 6 illustrates an exemplary system 600 and related operations for transferring a user service environment 632 based on a current geographical location of a mobile device 610. The mobile device 610 may provide its current geographical location to a user service environment relocation module 620. The user service environment relocation module 620 may determine that the current geographical location of the mobile device 610 is within a specific region. The region may include a local availability zone 640 containing a group of servers. However, the user service environment relocation module 620 may determine that machine images 636 for computing instances 634 in the user service environment 632 are not stored at the local availability zone 640. Rather, the user service environment relocation module 620 may determine that the machine images 636 are stored in a group of servers at a remote availability zone 630 (i.e., in a different region). Therefore, the user service environment relocation module 620 may transfer the machine images 636 from the remote availability zone 630 to the local availability zone 640. In other words, the machine images 636 may be transferred to the availability zone that the mobile device 610 is currently within. In addition, applications, services, IDEs, editors, etc. may be transferred to the availability zone that the mobile device 610 is currently within. As a result, the machine images 636 may be stored at a location that is closer to the mobile device's current geographical location, thereby improving the user service environment's runtime performance (e.g., when running graphics applications) and reducing latency. In addition, network interfaces may be transferred based on the mobile device's current geographical location.

The mobile device's user may access the user service environment 632 using a domain name system (DNS) entry (e.g., www.tomsenvironment.com) that is the same whether the user service environment 632 is located in the local availability zone 640 or whether the user service environment 632 is located in the remote availability zone 630. In other words, the DNS entry may point to a first address (e.g., an internet protocol address) associated with the user service environment 632 in the local availability zone 640 when the mobile device 610 is located within the local availability zone 640, or alternatively, the same DNS entry may point to a second address associated with the user service environment 632 in the remote availability zone 630 when the mobile device 610 is located within the remote availability zone 630. Therefore, the user may access the user service environment 632 in a similar manner regardless of the user's geographical location. The DNS entry may be reconfigured to point to the second address instead of the first address when the user service environment 632 is transferred from the remote availability zone 630 to the local availability zone 640. In addition, the address at which the DNS entry points to may be periodically updated (e.g., every few minutes or hours) so that the mobile device accesses 610 the correct address for the user service environment 632.

As a non-limiting example, the user service environment relocation module 620 may determine that the mobile device 610 is located in Virginia. In addition, the mobile device 610 may be detected to be within a local availability zone 640 (e.g., the local availability zone 640 may serve an eastern region of the United States). However, the user service environment relocation module 620 may determine that the machine images 636 for the computing instances 634 in the user service environment 632 are being stored at a remote availability zone 630 (e.g., the remote availability zone 630 may serve a western region of the United States). The machine images 636 may be stored in the remote availability zone 630 because the mobile device 610 may frequently be located in Oregon (which is within the remote availability zone 630). Therefore, the user service environment relocation module 620 may transfer the machine images 636 from the remote availability zone 630 to the local availability zone 640. When the mobile device 610 returns back to Oregon, the user service environment relocation module 620 may automatically transfer the machine images 636 back to the availability zone that serves the western region of the United States upon detection of the mobile device's updated geographical location.

Figure 7:
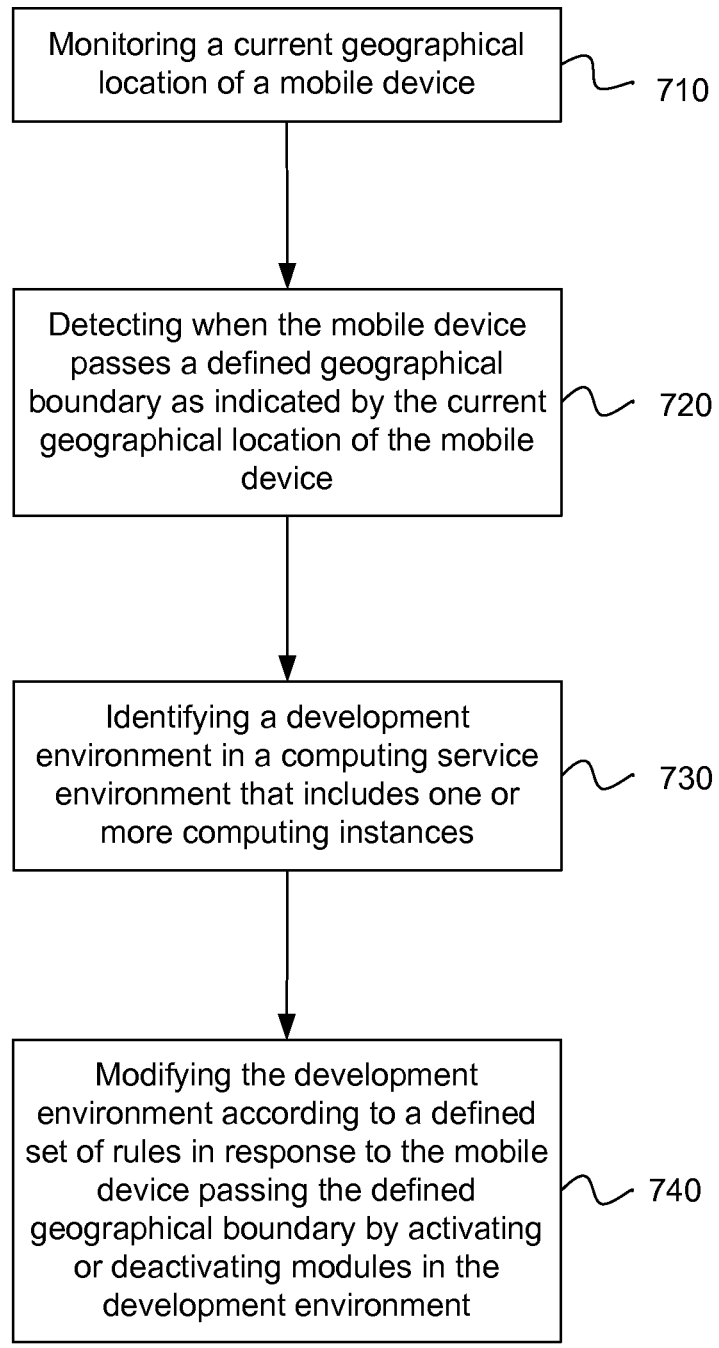
FIG. 7 is a flowchart of an example method for modifying development environments.

FIG. 7 illustrates an example of a method for modifying development environments. A current geographical location of a mobile device may be monitored, as in block 710. In one example, the mobile device's current geographical location may be periodically provided by the mobile device. The mobile device may determine its position using global positioning system (GPS), inertial navigation, triangulation, or other navigation techniques.

The current geographical location of the mobile device may indicate when the mobile device passes a defined geographical boundary, as in block 720. In one example, the defined geographical boundary may be received from a user associated with the mobile device. In one example, the geographical boundary may be defined using geographical coordinates (e.g., latitude and longitude). In addition, the geographical boundary may be defined as a particular neighborhood, area, street intersection, etc. The user may provide the defined geographical boundary via a user interface.

A development environment in a computing service environment may be identified, as in block 730. In one example, the development environment may be associated with the mobile device. The development environment (or integrated development environment) may include one or more computing instances that are running on one or more physical hosts. The mobile device's user may use the development environment for developing software, running applications, data analysis, etc.

The development environment may be modified according to a defined set of rules in response to the mobile device passing the defined geographical boundary, as in block 740. The development environment may be modified by activating or deactivating modules in the development environment. The modules in the development environment may include computing instances, applications and/or services. The defined set of rules may be received, via the user interface, from the user associated with the mobile device. The defined set of rules may describe which modifications are to be implemented at the development environment when the mobile device enters the defined geographical boundary or exits the defined geographical boundary. In one example, modifying the development environment according to the defined set of rules may include turning on the computing instances in the development environment, turning off the computing instances in the development environment, launching and terminating services, launching and terminating an integrated development environment, or launching and terminating software applications on the computing instances in the development environment.

In one configuration, the current geographical location of the mobile device may be within a region containing a group of servers. Machine images for the computing instances in the development environment may be detected as not being currently stored on the group of servers in the region. The machine images may be associated with the user of the mobile device. The machine images may be transferred from another storage location to the group of servers in the region. As an example, the machine images may be transferred to the group of servers in the region in order to reduce latency when communicating with computing instances launched using the machine images. The transfer or movement of the machine images based on the mobile device location to other geographic regions or availability zones may be transparent to the user. For example, a user may not explicitly know what availability zone the user is located within but the transfer may happen in the background as an automatic optimization (e.g. to decrease network traffic from Singapore servers to Dublin servers when the user travels to Dublin).

In one example, the current geographical location of the mobile device may indicate that the mobile device has exited the defined geographical boundary. The development environment may be modified according to the defined set of rules in response to the mobile device exiting the defined geographical boundary. In another example, historical times at which the mobile device enters the defined geographical boundary or exits the defined geographical boundary may be identified. Previous modifications to the development at the historical times may be identified. The development environment may be modified at a current time that corresponds with the historical times and the previous modifications.

Figure 8:
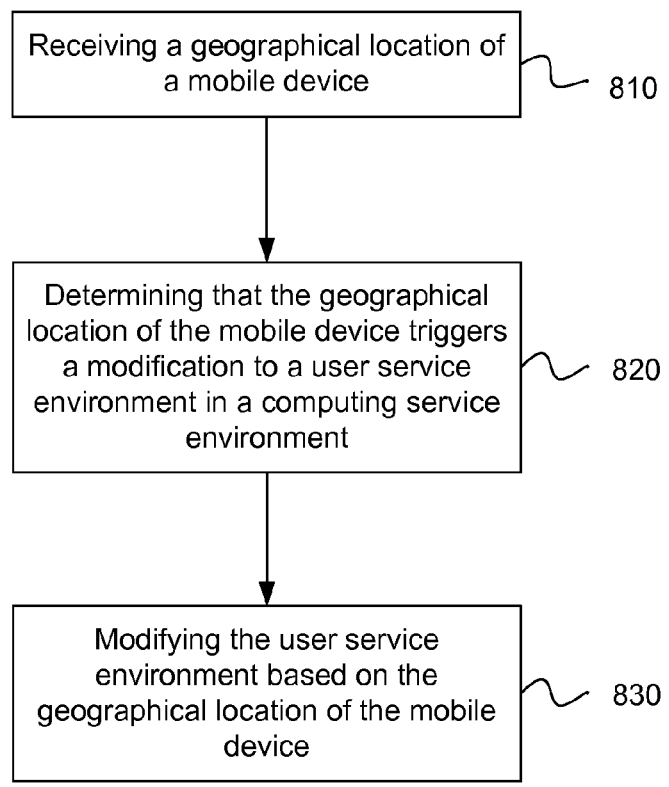
FIG. 8 is a flowchart of another example method for modifying development environments.

FIG. 8 illustrates an example of a computer implemented method for modifying user service environments. A current geographical location may be received from a mobile device, as in block 810. The mobile device may determine its position using global positioning system (GPS), inertial navigation, triangulation, or other navigation techniques. In one example, the current geographical location of the mobile device may be determined based on a radio frequency identification (RFID) tag associated with the mobile device. An RFID reader (e.g., in a building) may detect the RFID tag on the mobile device, and then provide the mobile device's current location (e.g., the mobile device's current location in the building). In addition, the mobile device's direction (e.g., exiting the building or entering the building) may be determined.

The current geographical location of the mobile device may trigger a modification to a user service environment in a computing service environment, as in block 820. The user service environment may be associated with the mobile device. In one configuration, a defined set of rules may be received from the user associated with the mobile device. The defined set of rules may cover constraints regarding where the current geographical location of the mobile device triggers the modification to the user service environment and a type of modification to be implemented at the user service environment. For example, the defined set of rules may indicate that the user service environment is to be powered down when the mobile device's current location is outside a defined geographical boundary.

The user service environment may be modified based on the current geographical location of the mobile device, as in block 830. In one example, modifying the user service environment may include turning on computing instances in the user service environment, turning off the computing instances in the user service environment, launching and terminating services, launching and terminating an integrated user service environment, or launching and terminating software applications on the computing instances in the user service environment. In another example, the user service environment may be modified when the mobile device exits a defined geographical boundary as indicated by the current geographical location of the mobile device, or alternatively, the user service environment may be modified when the mobile device enters a defined geographical boundary as indicated by the current geographical location of the mobile device. In yet another example, the user service environment may be modified based on a current trajectory of the mobile device.

In one configuration, the current geographical location of the mobile device may be within an availability zone containing a group of servers. Machine images for the computing instances in the user service environment may be detected as not being currently stored on the group of servers in the availability zone. The machine images may be associated with a user of the mobile device. The machine images may be transferred from another storage location to the group of servers in the availability zone.

In one example, previous geographical locations of the mobile device over a defined period of time that triggered modifications to the user service environment may be identified. Patterns in the previous geographical locations of the mobile device and corresponding modifications to the user service environment may be determined using machine learning. The user service environment may be modified at a current time that corresponds with the patterns in the geographical locations of the mobile device and the corresponding modifications to the user service environment. In another example, the user of the mobile device may be prompted to authorize the modification of the user service environment. The user service environment may be modified upon receiving approval from the mobile device.

Figure 9:
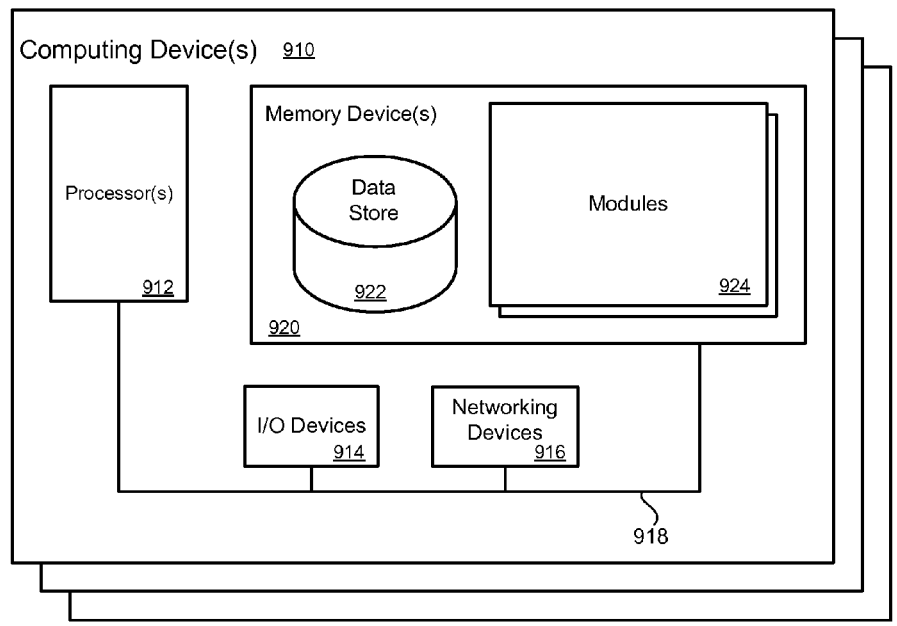
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 1324. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for modifying development environments, the method comprising:
   under control of one or more computer systems configured with executable instructions:
   monitoring a current geographical location of a mobile device, using one or more processors of the computer systems;
   detecting when the mobile device passes a defined geographical boundary as indicated by the current geographical location of the mobile device, using the one or more processors of the computer systems;
   identifying historical times at which the mobile device enters the defined geographical boundary or exits the defined geographical boundary, using the one or more processors of the computer systems;
   identifying a development environment in a computing service environment that includes one or more computing instances, using the one or more processors of the computer systems;
   identifying previous modifications to the development environment at the historical times, using the one or more processors of the computer systems; and
   modifying the development environment according to a defined set of rules and the previous modifications to the development environment at the historical times in response to the mobile device passing the defined geographical boundary, wherein the development environment is modified by activating or deactivating modules in the development environment, using the one or more processors of the computer systems.

2. The method of claim 1, wherein modifying the development environment according to the defined set of rules includes at least one of: turning on the computing instances in the development environment, turning off the computing instances in the development environment, executing services, executing an integrated development environment, or executing software applications on the computing instances in the development environment.

3. The method of claim 1, further comprising:
   determining that the current geographical location of the mobile device is within a region containing a group of servers;
   determining that machine images for the computing instances in the development environment are not currently stored on the group of servers in the region, the machine images being associated with a user of the mobile device; and
   transferring the machine images from another storage location to the group of servers in the region in order to reduce latency when communicating with computing instances launched using the machine images.

4. The method of claim 1, further comprising:
   detecting when the mobile device exits the defined geographical boundary as indicated by the current geographical location of the mobile device; and modifying the development environment according to the defined set of rules in response to the mobile device exiting the defined geographical boundary.

5. The method of claim 1, further comprising:
receiving the defined geographical boundary associated with the mobile device; and
receiving the defined set of rules that describe which modifications are to be implemented at the development environment when the mobile device enters the defined geographical boundary or exits the defined geographical boundary.

6. A computer-implemented method, the method comprising:
under control of one or more computer systems configured with executable instructions:
receiving a geographical location of a mobile device, using one or more processors of the computer systems;
determining that the geographical location of the mobile device triggers a modification to a user service environment in a computing service environment, using the one or more processors of the computer systems;
identifying previous geographical locations of the mobile device over a defined period of time that triggered modifications to the user service environment, using the one or more processors of the computer systems;
determining patterns in the previous geographical locations of the mobile device and corresponding modifications to the user service environment using machine learning, using the one or more processors of the computer systems; and
modifying the user service environment based on the geographical location of the mobile device, the patterns in the previous geographical locations of the mobile device and the corresponding modifications to the user service environment, using the one or more processors of the computer systems.

7. The method of claim 6, wherein modifying the user service environment includes at least one of: turning on computing instances in the user service environment, turning off the computing instances in the user service environment, modifying services, modifying an integrated development environment, or modifying software applications on the computing instances in the user service environment.

8. The method of claim 6, further comprising:
determining that the geographical location of the mobile device is within a region containing a group of servers;
determining that machine images for computing instances in the user service environment are not currently stored on the group of servers in the region, the machine images being associated with a user of the mobile device; and
transferring the machine images from another storage location to the group of servers in the region.

9. The method of claim 6, further comprising receiving a defined set of rules, covering constraints regarding where the geographical location of the mobile device triggers the modification to the user service environment and a type of modification to be implemented at the user service environment.

10. The method of claim 6, further comprising:
modifying the user service environment when the mobile device enters a defined geographical boundary as indicated by the geographical location of the mobile device; or
modifying the user service environment when the mobile device exits the defined geographical boundary as indicated by the geographical location of the mobile device.

11. The method of claim 6, further comprising registering the mobile device with the user service environment in the computing service environment.

12. The method of claim 6, further comprising determining the geographical location of the mobile device based on a radio frequency identification (RFID) tag associated with the mobile device.

13. The method of claim 6, further comprising modifying the user service environment based on a current trajectory of the mobile device.

14. The method of claim 6, further comprising:
prompting a user of the mobile device to authorize the modification to the user service environment; and
modifying the user service environment upon receiving approval from the mobile device.

15. A system for modifying user service environments, the system comprising:
at least a portion of one processor;
a memory device including a data store to store a plurality of data and instructions that, when executed by at least the portion of one processor, cause the system to:
monitor a current geographical location of a mobile device;
determine that the current geographical location of the mobile device triggers a modification to a user service environment that is associated with the mobile device;
identify previous geographical locations of the mobile device over a defined period of time that triggered modifications to the user service environment;
determine patterns in the previous geographical locations of the mobile device and corresponding modifications to the user service environment using machine learning; and
modify the user service environment based on the current geographical location of the mobile device, the patterns in the previous geographical locations of the mobile device and the corresponding modifications to the user service environment.

16. The system of claim 15, wherein the plurality of data and instructions that, when executed by at least the portion of one processor, further causes the system to:
activate a portion of the user service environment based on the current geographical location of the mobile device; or
deactivate a portion of the user service environment based on the current geographical location of the mobile device.

17. The system of claim 15, wherein the plurality of data and instructions that, when executed by at least the portion of one processor, further causes the system to: modify the user service environment when the mobile device enters a defined geographical boundary or exits the defined geographical boundary as indicated by the current geographical location of the mobile device.

18. The system of claim 15, wherein the plurality of data and instructions that, when executed by at least the portion of one processor, further causes the system to:
determine that the current geographical location of the mobile device is within a region containing a group of servers;
determine that machine images for computing instances in the user service environment are not currently stored on the group of servers in the region, the machine images being associated with a user of the mobile device; and
transfer the machine images from another storage location to the group of servers in the region.

\* \* \* \* \*